UNITED STATES PATENT OFFICE.

SAMUEL PEACOCK, OF CHICAGO, ILLINOIS.

PROCESS FOR EXTRACTING ALUMINA FROM FELDSPAR.

1,036,897.  Specification of Letters Patent.  Patented Aug. 27, 1912.

No Drawing. Original application filed April 8, 1911, Serial No. 619,829. Divided and this application filed May 15, 1912. Serial No. 697,562.

*To all whom it may concern:*

Be it known that I, SAMUEL PEACOCK, a citizen of the United States, residing at Chicago, in the county of Cook and State of Illinois, have invented certain new and useful Improvements in Processes for Extracting Alumina from Feldspar; and I do hereby declare the following to be a full, clear, and exact description of the invention, such as will enable others skilled in the art to which it appertains to make and use the same.

This invention relates to a process for extracting alumina during the extraction of potash from feldspar, and has for its object to recover said alumina in a pure state while recovering the potassium in the form of an oxid $K_2O$, employing caustic lime in order to fix the silica as an insoluble silicate of lime, all as is disclosed and claimed in my copending application #619,829, entitled "Process for extracting alumina and potash from feldspar," and filed April 8, 1911, of which this application is a division.

With these and other objects in view, the invention consists in the novel steps constituting my process more fully hereinafter disclosed and particularly pointed out in the claim.

As is well known, a typical feldspar contains $SiO_2$, $Al_2O_3$, $Fe_2O_3$, $K_2O$, $Na_2O$, $CaO$ and $MgO$; and there are a number of processes known or in use for the recovery of the potash from feldspar, which involve the formation of calcium silicates and alkaline aluminates. One of the industrial defects in most of these processes, however, is, no account is taken of the fact that the temperature of formation of calcium silicate by the dry process, a large proportion of the potash or soda present will be driven off by volatilization, and therefore the recovery of the alumina as such will be far below the quantity represented by the computed aluminate, due to its compounds with lime. On the other hand, if a considerable excess of potash or soda is added to counter-act these objections, the silica will combine proportionately with the alkali and lime, in accordance with the law of mass action, and the recovery of the alumina by forming a soluble aluminum salt, is defeated.

In carrying out my process, I first coarsely crush a mixture of feldspar or similar aluminiferous mineral to be decomposed, and add sufficient carbonate of lime to supply at least one and not more than two chemical equivalents of calcium oxid $CaO$ to each chemical equivalent of silica $SiO_2$ in the mixture. I then subject the mixture to a temperature sufficient to convert all the crystalline mineral material into the amorphous form. This later operation is preferably conducted in a rotary kiln such as is ordinarily used in the manufacture of cement.

I have discovered, as is pointed out in my said application above, in calcining minerals containing potash and another metallic oxid which may develop basic properties such as lime, to a point sufficient to destroy the crystalline structure of the mineral, that all or substantially all of the potash present is displaced or removed by volatilization. By adding lime-stone, however, before the calcination takes place there is produced a potash carrying gas comparatively high in carbon dioxid $CO_2$ which may be utilized at a later stage in the process, as will appear below, and by scrubbing such gas as it exits from the kiln any volatilized potash may be recovered as a carbonate. After the mineral material is calcined, it is pulverized to not less than say 100 mesh as is usually done in the manufacture of Portland cement, and it is then carefully sampled and its constituents determined. To the pulverized mineral I next add sufficient potash or soda recovered as above, or otherwise obtained, to make, when computed with the potash or soda that has been found to already exist in the calcined and pulverized material, one chemical equivalent of potash or soda to each chemical equivalent of alumina present. The mixture is next boiled, preferably under pressure, and with sufficient water to make a thin paste. The alumina then becomes soluble as an alkaline aluminate and the silica remains insoluble as a lime silicate. The soluble and insoluble portions of the charge are next separated as by filtration, and the soluble alkaline aluminate is treated with carbon dioxid by means of which nearly all the alkali is separated from the alumina, producing insoluble alumina and an alkaline carbonate in substantial accordance with the following reaction:—

$$K_2Al_2O_4 + CO_2 = K_2CO_3 + Al_2O_3.$$

As is well known, all of the alkali cannot be separated from the aluminate by this method, as a small proportion forms a compound with that portion of the alumina which resists separation by filtration. This loss of alkali is not of commercial importance, yet its presence in the alumina unfits the latter for certain specific valuable uses, and therefore reduces the industrial value of the alumina thus contaminated. In order, therefore, to remove this remaining alkali, the crude alumina resulting from the carbonating process is carefully sampled and its contents of alkali and silica determined. I then add to the crude alumina sufficient amorphous silica to form with such silica as is found present in the crude alumina, one equivalent of silica to each equivalent of soda or potash found present in the said crude alumina. This mixture is next treated in a digester or autoclave with superheated steam under pressure of substantially five atmospheres, more or less, as may be found necessary to decompose all the insoluble alkaline aluminates. The pressure and time of digestion is found dependent upon the amount of insoluble alkaline aluminates present. The digester or autoclave charge is then filtered while hot and thoroughly washed with water, with the result that the silica and alkali are removed as an alkali silicate leaving a residuum of alumina practically pure, and suitable for de-hydration at high temperatures, which is adaptable for all the ordinary industrial uses.

The carbon dioxid employed in the treatment of the alkaline aluminate above, may be derived from that driven off from the kiln after it has gone through a scrubber, or of course it may be obtained from any other source. The volatilized alkali which escapes from the kiln with said gas is readily recovered in a scrubbing process as a carbonate, and together with the carbonate derived from the alkali aluminate above, may be subjected to any suitable and well known process of the production of the oxid such as $K_2O$, or it may be sold as a carbonate.

What I claim is:—

The steps in the process of recovering alumina and potash from feldspar, which consists in suitably producing an alkaline aluminate containing potash from said feldspar; treating the said aluminate with carbon dioxid to separate out a portion of the potash; and then digesting said aluminate with amorphous silica to remove the remainder of said potash, substantially as described.

In testimony whereof, I affix my signature, in presence of two witnesses.

SAMUEL PEACOCK.

R. M. PARKER,
T. A. WITHERSPOON.